United States Patent [19]

Roberts

[11] 4,381,280
[45] Apr. 26, 1983

[54] METHOD AND DEVICE FOR PRODUCING NUCLEAR FUSION

[75] Inventor: Thomas G. Roberts, Huntsville, Ala.

[73] Assignee: The United States of America as represented by the Secretary of the Army, Washington, D.C.

[21] Appl. No.: 202,811

[22] Filed: Oct. 31, 1980

[51] Int. Cl.³ .............................................. G21B 1/02
[52] U.S. Cl. .................................. 376/105; 250/398; 250/396 ML
[58] Field of Search .............................. 376/105, 106; 250/396 R, 396 ML, 398

[56] References Cited

U.S. PATENT DOCUMENTS

| | | | |
|---|---|---|---|
| 2,741,704 | 4/1956 | Trump et al. | 250/398 |
| 2,953,718 | 9/1960 | Ducati | 315/163 |
| 3,489,645 | 1/1970 | Daiber et al. | 176/1 |
| 3,833,814 | 9/1974 | Nablo | 250/492 |
| 3,864,640 | 2/1975 | Bennett | 328/228 |
| 3,892,970 | 7/1975 | Freeman et al. | 250/396 |
| 3,899,681 | 8/1975 | Beckner et al. | 250/502 |
| 3,968,378 | 7/1976 | Roberts et al. | 250/502 |
| 4,263,095 | 4/1981 | Thode | 376/105 |

OTHER PUBLICATIONS

Roberts et al., "An Electron Beam Initiated Fusion Neutron Generator", IEEE Transaction on Plasma Science, vol. PS-2, Dec. 1974, pp. 257-260.
Kirkpatrick et al., "Structured Fusion Target Design," Nuclear Fusion, Apr. 1975, pp. 333-335.
Roberts et al., "The Pinch Effect in Pulsed Streams at Relativistic Energies," Plasma Physics, vol. 10, Pergamon Press, pp. 381-389.
Roberts et al., "Return Current Distributions for Improved Stabilization of Pinched Plasmas in Curved Tubes," Journal of The Alabama Academy of Sciences, vol. 41, No. 4, Oct. 1970, pp. 254-262.
Roberts, "Condition for Injection of Intense Relativistic Electron Beams into a Z Pinch", IEEE Transactions on Plasma Science, vol. PS-3, No. 4, Dec. 1975, pp. 216-221.
"Fusions by Electron Beam Produced at Sandia," Science News, vol. 112, No. 1, Jul. 2, 1977, p. 4.
Instrum. Exper. Tech. (USA) No. 6, (Nov.-Dec. 1969), pp. 1508-1510, "Quasioptical-Beam Divider", Akhiezer.

Primary Examiner—Harvey E. Behrend
Attorney, Agent, or Firm—Nathan Edelberg; Robert P. Gibson; Freddie M. Bush

[57] ABSTRACT

A triggering device and method for producing nuclear fusion reactions and having two or more intense pulses of high energy electrons derived from a single source and delivered to a target along separate paths but arriving at substantially the same time. The electron beams are produced in the electrode space of an electron accelerator which utilizes a cathode for producing multiple electron beams. Each electron beam is injected into a separate conventional linear pinch discharge. The high energy electron beams follow the pinch discharge and are delivered to the target. The pinch discharge tubes are curved so that each electron beam approaches the target from a different direction for irradiating the target symmetrically. Return conductors strategically located on the outer surface of each pinch discharge tube maintains the curved discharge within the center of the tube and sustains the pinch.

6 Claims, 5 Drawing Figures

METHOD AND DEVICE FOR PRODUCING NUCLEAR FUSION

DEDICATORY CLAUSE

The invention described herein may be manufactured, used, and licensed by or for the Government for governmental purposes without the payment to me of any royalties thereon.

BACKGROUND OF THE INVENTION

It is well known to those skilled in the art that the main ingredients of a nuclear fusion process are the nuclei of Hydrogen. In particular, its isotopes, deuterium and tritium (D-T). A fusion reaction consist of these light nuclei coalescing to form heavier elements with the release of energy. In order to coalesce or react these isotopes, referred to as the fuel, must be ionized to form a plasma. In the plasma state they have a net positive charge and normally repel one another. Therefore, before a fusion reaction can occur the repulsion force between the nuclei must be overcome by energetic collisions. However, even in energetic collisions there is a greater probability that the colliding nuclei will not fuse but will, instead, rebound elastically.

Thus, the plasma must be confined in a region where they will approach each other and collide many times until fusion eventually takes place. The temperature required for the collisions to be energetic enough for the fusion reaction to produce more energy than the plasma loses by radiation is of the order of $10^{8°}$ K. This temperature is a threshold value or initiation temperature; and because of the energy losses such as radiation and particle losses due to instabilities which occur concurrently with the additions of heat energy, the critical temperature for sustaining the reaction has to be even higher than that required to initiate fusion.

The critical temperature requirement and the need for confining the plasma for a long enough time for an appreciable fraction of the fuel to burn precludes the use of material walls. Thus, for relatively low density plasmas, all feasible methods of containing the plasma rely on some form of magnetic confinement means. These low density plasmas require quite long confinement times because it is agreed by those skilled in the art that the product of density and confinement time must exceed a certain value before the reaction can be sustained. However, the longer the confinement time, the greater the energy losses due to the leakage of particles, to other instabilities, and to radiation which is greatly aggravated by the presence of any contaminates.

For many years the research effort on controlled thermonuclear fusion was dominated by problems associated with magnetic confinement. However, all attempts to achieve useful controlled fusion energy release by these methods have been unsuccessful. Therefore, recently, there have been attempts to solve the controlled thermonuclear fusion problem by producing a microsize nuclear explosion. To accomplish this it is necessary to use a small fuel target and to produce a small clean energetic trigger which is capable of producing the very high temperatures required to ignite a very small thermonuclear explosion in the small volume of dense D-T mixture within a very short time. This time is determined by the time required for the plasma to cool.

An ideal trigger would produce the necessary energy in a very short pulse which could be readily guided to the target and focused into the small volume of the target. The energy should be in a form such that it is totally absorbed by the small amount of target material. Preferably in a manner so that the nuclear fuel is heated uniformly. Thus, because of the ease with which short pulse length, high power laser beams can be guided to targets and focused into small volumes, they have been considered as a trigger. The basic idea of a laser-driven fusion device is to heat a small pellet or target containing a deuterium-tritium (D-T) mixture to ignition temperatures by the absorption of laser light in a time short compared to the time, $T_d$, of its disassembly at the speed of sound in the material at the ignition temperature.

Of course, the D-T reaction time, $T_r$, must be short compared to $T_d$ and the range of the 3.5 MeV alpha particles which are produced should be less than the radius of the target. These conditions cannot be met at solid D-T densities with lasers which can be expected to be developed in the foreseeable future. Therefore, the targets are designed so that the D-T fuel is compressed by a factor of $10^3$ to $10^4$ above its solid density by a compressive pressure which is the reaction to the outward momentum of an ablating outer region of heavy material about the target. Pressures of the order of $10^{12}$ atmospheric are estimated to occur during the ablation-implosion process in laser fusion concepts. However, to achieve these pressures the laser pulse or pulses must have a special form, that is, they must be tailored according to the target requirements and the target must be spherically radiated. Multiple laser beams can be produced and guided to targets so that the targets are spherically radiated. Special care must be taken so that the beam from each laser arrives at the target at the same time. Laser beams have been used to generate high temperature dense plasma from which a few ($10^4$) neutrons have been obtained. However, the energy limit of currently available lasers imposes severe restrictions on their use for this purpose.

Numerous articles have been published which disclose the limitations of lasers for this purpose. A typical article is "LASER FUSION", Practical Power Plant May be Unattainable—Panel" Nuclear News, pages 79–80, May 1975. State of the art laser technology is noted as being inadequate for laser fusion.

Relativistic electron beams possess energies which are several orders of magnitude larger than the best laser beams. Because of this, they are receiving attention as a means of achieving substantial thermonuclear yields by compression and heating of small masses of D-T fuel. This, of course, is the electron beam analogue of the inertial confinement schemes that employ lasers. However, difficulties associated with the use of high energy electron beams stem from the requirements for focusing and guiding them to small targets; from their relatively long pulse lengths (tens of nanoseconds); and from their long energy deposition lengths in dense mixtures of T-D fuels. To overcome these problems, several prior art methods have been proposed which require the use of multiple electron beams and specially designed targets. For example, U.S. Pat. Nos. 3,892,970; 3,899,681 and T. G. Roberts et al, "An Electron Beam Initiated Fusion Neutron Generator," IEEE TPS, Vol. PS-2, pp. 257–260, December 1974, teach that the electron beams are to be delivered to the target simultaneously so that the target is radiated properly and hydrodynamic instabilities do not develop. Consideration of hydrodynamic stability requirements impose severe restriction on the design of electron beam imploded fusion targets. Thus, when several beams are used, a high degree of simultaneity is required to insure a sufficiently uniform implosion.

SUMMARY OF THE INVENTION

The nuclear fusion device produces a multiple high energy electron beam trigger for a "controlled" thermonuclear explosion (reaction) wherein two or more electron beams arrive at the target with a high degree of simultaneity. The beams arrive at the target within $10^{-11}$ seconds of each other. The targets used are either targets which allow only for one dimensional expansion for confinement of both the beam at the target and the instantaneous direction of expansion, when two electron beams are used, or a spherical target of hydrogen isotope fuel where more than two electron beams are used. The method and device for triggering nuclear fusion reactions satisfies the requirements for use of high energy electron beams to initiate a thermonuclear plasma. In addition it removes the target sufficiently far from the electron beam generator to allow protection of the generator or device from the explosion which is produced. This trigger is used to produce a high temperature high density D-T plasma which is contained for times long enough for the copious production of neutrons and for the release of thermonuclear energy in excess of that required to produce the trigger. The confinement time is determined by the rate of energy loss by radiation which is low enough to allow the use of currently produced electron beams. The confinement time may also be determined by the ultimate disassembly of the target. A unique feature of this trigger device is the ability to deliver the separate high energy electron beams to the target at exactly the same time. The target is symmeterically radiated. Delivery of the electron beams at exactly the same time actually means that the pulses of high energy electrons arrive at the target within at least $10^{-11}$ seconds of each other. That is nearly simultaneously. The electron beams are produced in the electrode space of a conventional pulsed electron accelerator which utilizes a cathode for producing multiple electron beams. These electron beams exit the accelerator through thin film transparent apertures in the anode of the accelerator. Each electron beam is injected into a separate conventional linear pinch discharge. The high energy electron beams follow the pinch discharge and are delivered to the target. Each pinched discharge is curved so that each electron beam approaches the target from a different direction, thus irradiating the target symmeterically to produce a symmetrical implosion.

DESCRIPTION OF THE PREFERRED EMBODIMENT

Figure 1:
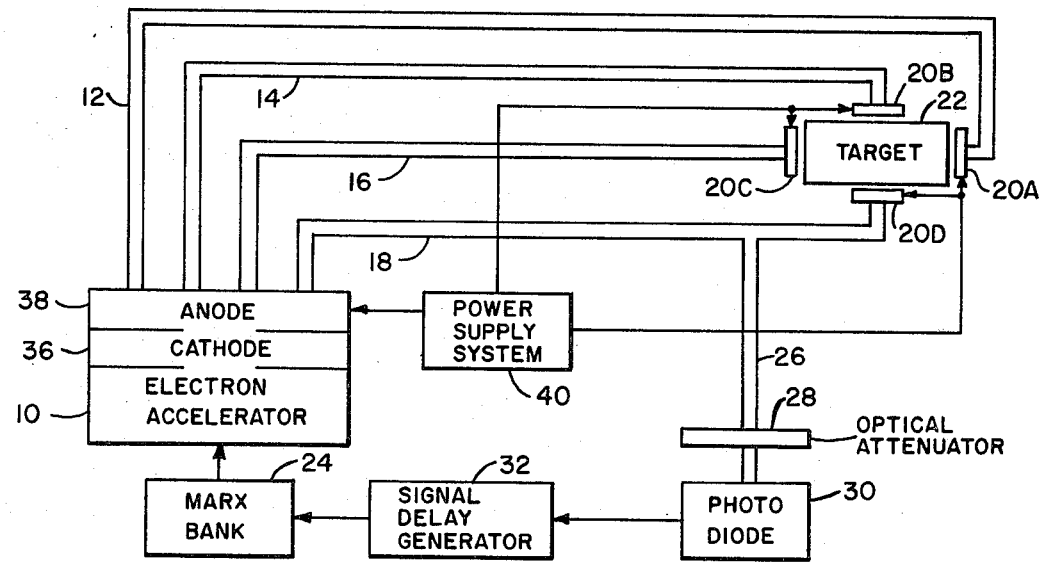
FIG. 1 is a block diagram of a preferred embodiment of the nuclear fusion trigger device.

Referring now to the drawings wherein like numbers represent like parts, FIG. 1 discloses a preferred embodiment of the invention wherein a triggering device is disclosed for producing nuclear fusion reactions. The triggering device comprises an electron accelerator 10 having plurality of linear pinch discharge tubes 12, 14, 16 and 18, which are coupled between accelerator 10 and a plurality of anodes 20 disposed around a target 22. A Marx bank 24 provides high voltage power to accelerator 10. An operationally controlled light pipe 26 is coupled to one of the discharge tubes (18) for providing an optical signal to optical attenuator 28 which activates a photo diode 30 to provide a signal to signal delay generator 32 for timely activation of Marx bank 24. The Marx bank contains its own power supply and is normally charged, being in a condition for discharge when the triggering signal is supplied by generator 32.

Electron accelerators for providing high electron flow are well established in the art and include a cathode assembly as typically shown at 36 for generating electron flow through an accelerating anode or electrode structure 38 to the target. Typical of such electron beam generators and accelerators are U.S. Pat. No. 3,864,640 to W. H. Bennett and U.S. Pat. No. 3,968,378 to T. G. Roberts et al. In view of the well established prior art teachings respecting such disclosures, the particular inner workings of the electron accelerator and related equipment is not detailed herein. A power supply system 40 is shown for supplying power to the linear pinch discharge tube electrodes 20 and 38, electrode 38 also being the anode of the electron accelorator.

Figure 2:
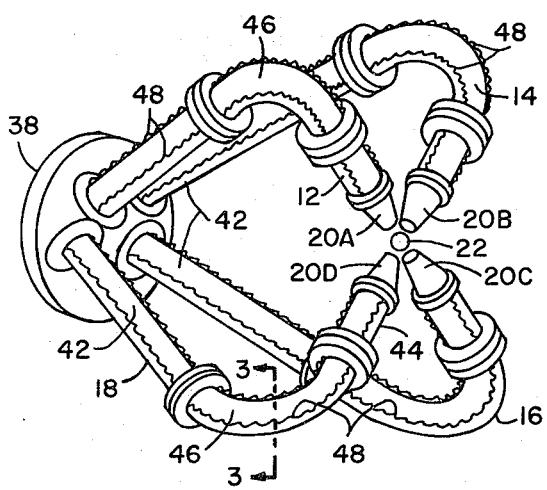
FIG. 2 is a diagrammatic view of a preferred embodiment of the curved pinch discharge tubes for the device of FIG. 1.

FIG. 2 shows a diagrammatic view of pinch discharge tubes 12, 14, 16 and 18 projecting from the anode 38 of the electron accelerator 10. Each pinch tube is shown having two straight portions 42 and 44 connected by a curve portion 46. A plurality of return conductors 48 are selectively arranged on the surface of each pinch discharge tube for providing a magnetic field to the pinch tube plasma for guiding the relativistic electron beam therein. The transport of the relativistic electron beam around the curve 46 of the pinch tube must not cause a perturbation which drives the plasma column unstable. Conductors 48 produce a curved, stable plasma column in each tube by providing current distribution in the return conductors so that the pinched discharge is partially back-strapped only on the curved portion of the tube. Thus the return conductors are properly arranged on the curved portions of the pinch tubes so that the curved discharges remain in the center of the respective tubes and do not move toward the outer walls. Typically, the coaxial pinch tube may be Pyrex glass containing a 90° turn on a 6 inch radius. For a 4-inch inside diameter Pyrex glass used as a coaxial pinch tube, return conductors have been provided using 8 copper conductors made from the outer shields of an RG8 coaxial cable. These return conductors are fitted closely to the outside surface of the glass tube and are equally spaced apart on the straight portions 42 and 44 of the tube. With the return conductors aligned axially with the pinch tube and correctly spaced around the circumference of the tube stable pinched plasma columns are obtained in the curved tubes.

Figure 3:
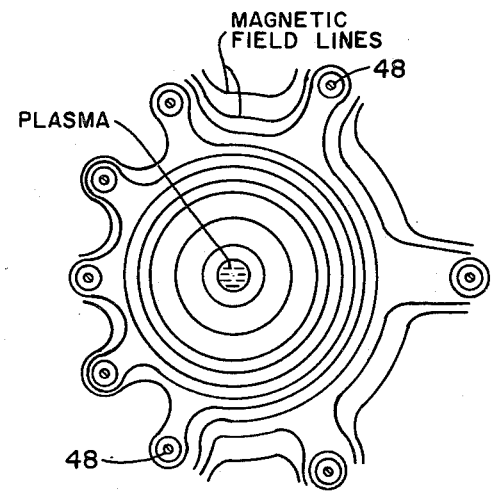
FIG. 3 is a drawing of magnetic field contours for specifically positioned electrical return conductors across the curved portion of a discharge tube.

FIG. 3 shows the magnetic field contoures in the 90° turns of the pinch tubes. For the example shown, the coaxial pinch tube is made of 4-inch inside diameter Pyrex glass having a 90° turn radius of 6 inches. Eight conductive wires 48 are selectively spaced around the surface of the tube for creating a uniform, circular magnetic field, maintaining the plasma within the tube away from the tube wall. Thus, current distribution comprises 9 current elements, 8 of which are the conductive wires located about the outside of the pinch tube, and the other is the plasma column which is located within the pinch tube. The particular structure and operation of curved pinch tubes is well established in the art as suggested by "Return Current Distributions for Improved Stabilization of Pinched Plasmas in Curved Tubes" by T. G. Roberts and T. A. Barr, Jr. published in the Journal of the Alabama Academy of Science Vol 41, No. 4, October 1970, pp 254–262. Roberts et al discloses that the stability of a pinched discharge in curved tubes can be improved by the simple method of arranging the return conductors so that the discharge is particially back-strapped in the proper manner.

Figure 4:
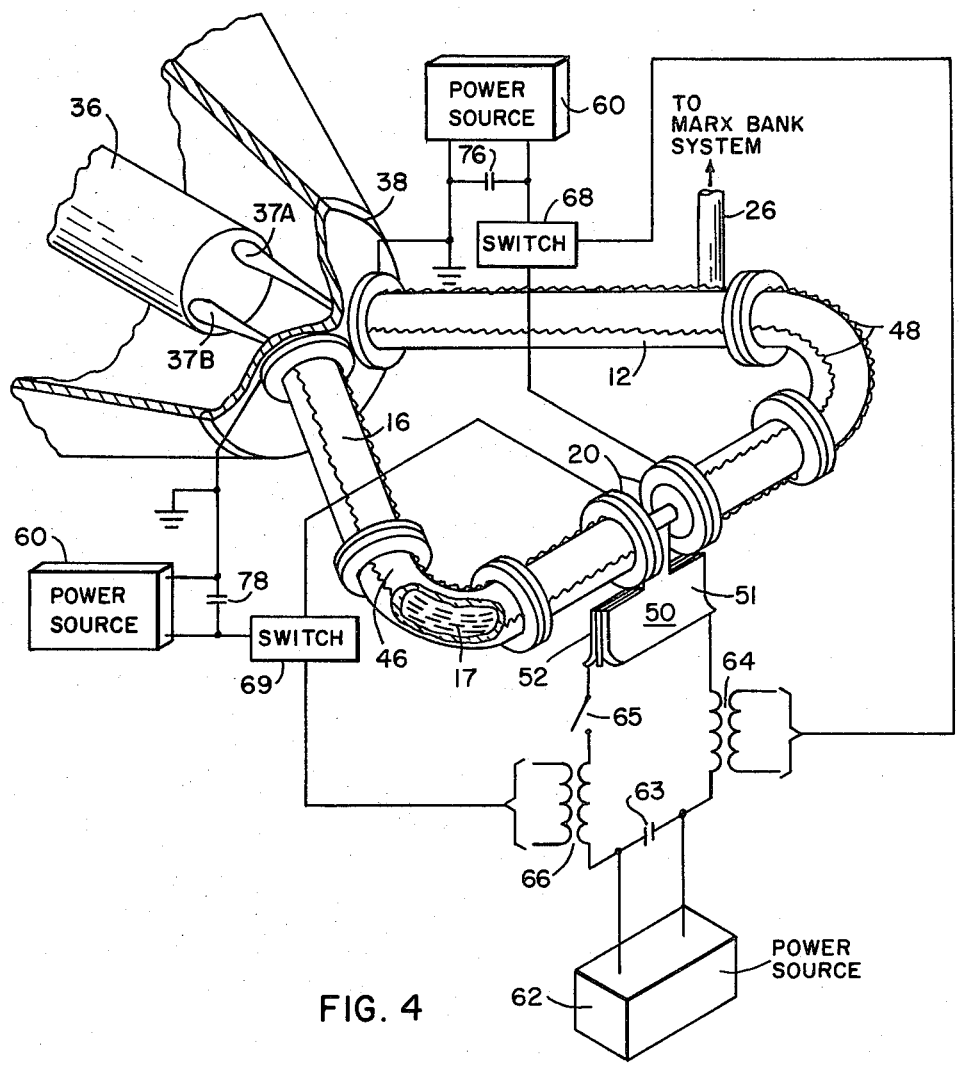
FIG. 4 is a diagrammatic and schematic view of two curved pinch discharge tubes and the electrical power source for directing and guiding an electron beam in the plasma.

FIG. 4 discloses an alternative embodiment of the linear pinch discharge tube structure showing two tubes 12 and 16 projecting from the accelerating anode 38 and curved to direct the electron beam in the plasma to the target which is placed between the anodes 20. Pyrex tube 46 is shown cutaway to show the plasma 17 and electron flow therein. Cathode 36 is shown having two projections 37A and 37B for emitting electron flow through the anode 38 at a point where the electron beam can be picked up by the plasma flowing in tubes 12 and 16.

A spherical target lends itself to activation by a trigger system involving a sufficient number of pinch discharge tubes to initiate the fusion reaction, as long as there is sufficient space for all tubes to terminate in the proximity of the target. Thus, while a spherical target, which expands 3-dimensionally, is operable with the structure of FIG. 2, the alternative embodiment of FIG. 4 lends itself to operation with a thin cylindrical target adapted for 1-dimensional expansion. The thin cylindrical target is held in target holder 50, (shown also in FIG. 5). The target holder may be cooled by cooling coils (not shown). Target holder 50 is shown comprising first and second sheets 51 and 52 having a neck portion and terminated or folded to form a cylindrical portion 54 for providing a cylindrical target chamber therein. The structure is very similar to that of a door hinge. The two conductive plates are separated by an insulator 55.

The thin cylindrical target 56 is disposed within the insulated cylinder 54. Cylinder 54 provides the theta pinch magnetic field to the target during operation. Cylindrical target 56 is constructed of the same materials as a spherical target. Typically, target 56 may comprise the fuel sealed in a cylindrical chamber 57 of a metal housing 58 which is similar in appearance and size to a segment of a small hypodermic needle. The housing 58 is then encomposed by a cylindrical shell 59 and placed in the insulator of cylinder 54.

Each discharge tube 12, 16, etc., requires a power souece 60. Power source 60 develops a potential between the thin target anodes 20 and the accelerating electrode 38 of the accelerator for providing the pinch effect to each tube. Where the target is a thin cylindrical target providing 1-dimensional expansion, an additional power source 62 is required for developing the magnetic field across the target holder 50, thereby restricting heat transfer to the target holder. For this embodiment power source 62 is coupled through a transformer 64 primary winding to plate 51 of holder 50, and through a primary winding of transformer 66 and a control switch 65 to plate 52 for providing the potential across the target. The secondary of transformer 64 is coupled to a switch 68 and the secondary of transformer 66 is coupled to a switch 69 for activating the respective switches after the magnetic field is developed across the target. Activation of switches 68 and 69 allows the pinch current to start flowing from power supplies 60 through conductors 48 for controlling the plasma position within tubes 12 and 16.

The behavior of high energy electron beams in pinched discharges is well established. For details concerning this established behavior, references include: T. G. Roberts and W. H. Bennett, "The Pinch Effect in Pulsed Streams at Relativistic Energies," Plasma Physics, Vol. 10, pp 381–389, Pergammon Press 1968; T. G. Roberts T. A. Barr, Jr., "Return Current Distributions for Improved Stabilization of Pinched Plasmas in Curved Tubes" Journal Alabama Academy of Sciences, Vol 41, No. 4, October, 1970; pp 254–262; T. G. Roberts, "Condition for Injection of Intense Relativistic Electron Beams into a Z Pinch," IEEE Transactions on Plasma Science, Vol. PS-3, No. 4, December 1975, pp 216–221; and U.S. Pat. No. 3,968,378 issued to Thomas G. Roberts et al.

Since the electron beams in accelerator 10 are born at one electrode 36 at the same time, the difference in their arrival time at the target is just the difference in their transient times through their respective pinch discharges. By making the discharge paths substantially the same lengths, this time difference may be made to be less than $10^{-11}$ seconds. These pinch tubes are curved to insure that the high energy electron beams approach the target at the same time from different directions, but elaborate methods are not required to stabilize these discharges. They are stabilized by the simple method of properly spacing the return conductors about the curved portion of the pinch tubes as noted hereinabove and set forth in detail in the article "Return Current Distribution for Improved Stabilization of Pinched Plasmas in Curved Tubes." Also, while two or more beams have been produced from one pulse of high energy electron accelerators by the use of multiple point cathodes as illustrated in U.S. Pat. No. 3,892,970 issued to Freeman et al these multiple beams were injected into the same pinched discharge where they coalesced to form one beam before ever reaching the target.

In the nuclear fusion device of FIG. 4 wherein only two electron beams are used, the target 56 which contains a 50/50 liquid deuterium-trituim (D-T) mixture is located between the anodes of the two pinched discharges and is held in place by the "$\theta$ pinch" coil 54 which is used to produce a high magnetic field to limit the radial heat conduction and provide one-dimensional expansion. The length of the target is determined by the range of the overlapping electron beams. The electrical force produced by the overlapping of the beams is sufficient to stop these beams in the target where their energy is deposited nearly uniformly raising the temperature of the target to a very high value. Due to the one-dimensional expansion of this configuration, the inertial confinement time, without depending on compression to higher densities, is long enough to allow the thermonuclear material to burn, thus producing a release of energy much greater than that released by the trigger.

This configuration may also be used with an implosion target. Here again the high energy electron beams strike the target at both ends, but, instead of entering the target, they are absorbed in an outer layer end cap of appropriate material of prescribed thickness. This end cap may be made of a high density material such as gold, tungsten, or uranium or the like and alloys with these materials, or an appropriate electron absorbing lower density material, such as lead, iron or the like. This end cap must be formed with proper thickness to absorb substantially all of the electron beams energy before the electron beam pulse terminates and the end cap is ablated and imploded. That is the end cap thickness should be great enough (of the order of one millimeter) to prevent or block substantially all of the electrons from penetrating the interiors of the target holder which contains the thermonuclear fuel (D-T mixture). An end cap made of the above material, and particularly the high density material with proper thickness will efficiently absorb the electron beam energy in its outer portions and act as a pusher by accelerating essentially cold, high density material inwardly to compress and heat the fuel and further function as a tamper during burning of the fuel. The end cap may be formed of a single material as indicated above, or it may be in discrete layers of different materials which will provide enhanced operation of the respective functions of absorption of the electron beams energy and acting as a pusher and tamper. For example, the outer layer which is most effective as an electron beam absorber and an inner layer of gold or tungsten or the like which function more effectively as a pusher and tamper material during fuel compression and burning.

In either case, the target 56 in this one-dimensional configuration must be held in the "$\theta$ pinch" coil, cylindrical portion 54. The magnetic field of the "$\theta$ pinch" is neccessary to retard the loss of heat in the radial direction and is not used for confinement. However, it does help to insure that the electron beams hit the ends of the target holder. It should also be noted that the curved pinch discharges not only remove the target from the anode of the electron accelerator, but also, cause the targets expansion to be parallel to instead of toward the anode of the accelerator.

When four or more electron beams are used as shown in FIGS. 1 and 2, the target is a spherical shell with the interior containing the thermonuclear fuel. In this case the magnetic field of the "$\theta$ pinch" is not needed as the confinement is inertial in all directions, and the mechanism with the most rapid rate of energy loss is the mechanical disassembly of the target. Thus, both the need to insure hydrodynamic stability and the requirement that the beams arrive at the target simultaneously are possible and are met.

Figure 5:
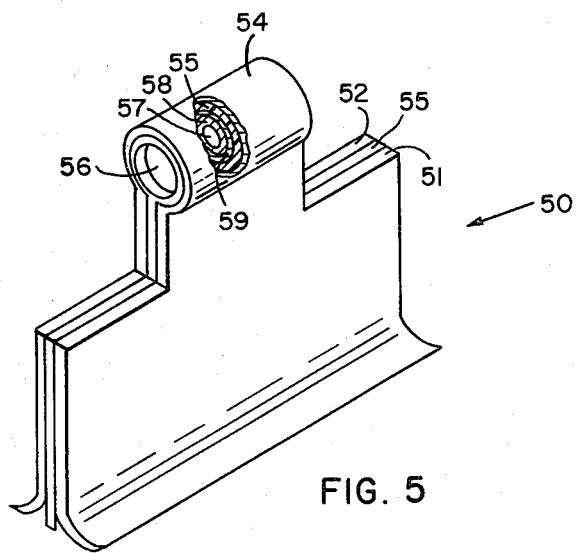
FIG. 5 is a perspective view of a target holder for the device of FIG. 3 for providing a magnetic means to reduce heat conduction from the target.

For a typical operation, with reference to FIGS. 4, 5 and 1, the events which occur after the power supplies 60, capacitor banks, and the Marx bank of the electron accelerator have been charged are as follows. When the switch 65 is closed, current from condenser bank 63 rises to a high value producing a magnetic field in the "$\theta$ pinch" coil 54 which is parallel to the projected directions from which the high energy electron beams will arrive. The change in the current (dI/dt) in the transmission line of the "$\theta$ pinch" machine causes a high voltage pulse to be formed in the pulse transformers 64 and 66. These pulses are transmitted through equal length coax-transmission lines and trigger switches 68 and 69. When switches 68 and 69 are closed the current from condenser banks 76 and 78 flows through the plasmas 17 of discharge tubes 12 and 16 and returns through the return conductors 48. As the current rises in these discharge tubes, the plasmas which are produced move away from the wall of the tubes and collapse toward the center of the pinch tubes. As the plasmas move toward the center of the tubes, the density, temperature, current, current density, and the light which is produced increase rapidly. When this light reaches a predetermined level set by the optical attenuator 28, the photo diode 30 actuates signal delay generator 32. After a predetermined delay set by the signal delay generator, the Marx bank which drives the electron accelerator is erected. This produces a very high voltage wave which causes a high current pulse of electrons to be drawn from the cathode elements 37. These electrons are accelerated toward the anode 38 and through the thin metal foil apertures (not shown) therein where they find themselves in the argon plasmas 17 which have been previously produced in the pinch tubes. These high energy electron beams propagate through the plasmas until they reach the target anodes 20. The difference in transit times for the two electron beams is determined by their propagation velocities and the difference in length of the two plasma columns. These lengths are made the same to within a fraction of an inch, thus insuring that the two beams arrive at very nearly the same time. That is the difference in arrival time may be as small as $10^{-11}$ seconds.

These high energy electron beams, after passing through the thin film aperatures in the anodes 20, enter the target from both ends. The target holder is made of steel and is about the size of a fairly small hypodermic needle and is held between these anodes by the insulator of the "$\theta$ pinch" coil 54. The magnetic field produced by the coil not only limits the radial heat conductivity, but also serves as a guide field for the electron beams after they leave the anodes 20. In this configuration, the energy which is lost to the steel ends which seal the D-T mixture in the target causes a compression wave to be propagated into the target. This compression increases the density of the D-T mixture and may heat it some. However, most of the energy delivered to the target comes from the beams remaining energy (which is most of it) being dissipated in the target. The range of these electrons in liquid D-T mixtures can be as long as tens of centimeters (for 10 MeV electrons). However, high current beams are suppose to have a much shorter range due to cooperative phenomena which arise between the beams' particles and the target material. But even if these cooperative phenomena do not limit the range of these beams, the forces produced by the counterstreaming currents in this configuration will. In this manner the volume of the thermonuclear fuel is kept small enough so that the energy in these electron beams is sufficient to raise the temperature of the fuel so that thermonuclear fusion of the target material takes place before the target is cooled by radiation, heat conduction, or expansion.

In an implosion target configuration where shorter target holders are used with the special end caps as described earlier hereinabove, the electron beams cause the outer portions of the end caps to ablate and vaporize and drive the inner portions of the end caps inward to implode the same against the fuel inside the target holder. As is known in the art, the implosion heats and compresses the fuel and cause ignition thereof. During the burning of the fuel, the inner portion of the end caps also serve as a tamper to hold the fuel compressed for a period of time to insure consumption of a substantial portion of the fuel. The fuel may be as little as 1 milligrams of isotopes.

For spherical targets as noted hereinabove, the "$\theta$ pinch" coil is not used, and the anodes of the discharge tube are made very close to each other with the target held in an insulator between these anodes as illustrated in FIG. 2. In this case, four or more electron beams are used to insure uniform erradiation by the high energy electron beams and the respective capacitor banks associated with each discharge tube are simultaneously triggered to start discharge current in the tubes.

The "$\theta$ pinch" magnetic field lasts for times of the order of $10^{-4}$ seconds. The plasmas in the pinch tubes last for several times $10^{-6}$ seconds and the high energy electron beams last for times of the order of $10^{-8}$ seconds. After compression of the fuel has been completed the fuel burns in times of the order of $10^{-12}$ seconds.

Although a particular embodiment and form of the invention has been illustrated, it will be obvious to those skilled in the art that modification may be made without departing from the scope and spirit of the foregoing disclosure. Therefore it is understood that the invention is limited only by the claims appended hereto.

I claim:

1. A trigger device for directing electron beam pulses toward a target comprising: an electron accelerator having a cathode for emitting electrons and an accelerating electrode having plural openings therein through which electrons exit said accelerator, said cathode being a multi-element cathode having a plurality of separate emitting portions for simultaneously generating separate electron beam pulses from a common source, said emitting portions being positioned adjacent respective openings, in said accelerating electrode for directing electrons from an emitting portion through a particular electrode opening, a plurality of curved dielectric linear pinch discharge tubes of equal length for directing the separate electron beam pulses to the target from different directions for symmetrically and simultaneously irradiating the target uniformly, each tube having a first end adjacent said accelerating electrode for receiving electrons therein from only one of said cathode emitting portions, a second end adjacent said target, and being filled with a plasma producing medium for providing electron transport through said tube.

2. A trigger device as set forth in claim 1 and further comprising a plurality of electrical conductors disposed along the length of each dielectric tube for developing a composite magnetic field within said tube and thereby controlling the position of electron beam transporting plasma within the tube.

3. A trigger device as set forth in claim 2 wherein said plurality of electrical conductors are disposed symmetrically around straight portions of said tubes and non-symmetrically around curved portion of said tubes for maintaining plasma flow away from the tube inner surfaces and toward the center of the tubes.

4. A trigger device as set forth in claim 3 wherein said plurality of electrical conductors are at least eight conductors and said non-symmetrically arranged portions of conductors are disposed to develop a stronger magnetic field on the outer radius of said curved tube portion than on the inner radius to effect bending of said electron beam and plasma within the tubes.

5. A trigger device as set forth in claim 4 wherein said plurality of tubes are four tubes, with respective first and second pair of said tubes each having the second end of said pair in coaxial alignment with each other and with said target therebetween for uniformily irradiating said target.

6. A trigger device as set forth in claim 4 wherein said plurality of dielectric tubes are 2 tubes, said tubes being disposed with the second ends thereof coaxially positioned for simultaneously irradiating said target from opposite directions, and means holding said target for developing a magnetic field parallel with the target axis for retarding heat loss in the radial direction and enhancing one-dimensional expansion in the direction of irradiation.

* * * * *